United States Patent
Hirose et al.

(10) Patent No.: US 6,573,954 B1
(45) Date of Patent: Jun. 3, 2003

(54) LIQUID CRYSTAL DISPLAY DEVICE AND ITS MANUFACTURING METHOD

(75) Inventors: Takashi Hirose, Ishikawa (JP); Nobuyuki Tsuboi, Ishikawa (JP); Tatsuya Wakimoto, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/469,815

(22) Filed: Dec. 22, 1999

(30) Foreign Application Priority Data

Dec. 22, 1998 (JP) .......................... 10-364333

(51) Int. Cl.[7] .............................. G02F 1/136
(52) U.S. Cl. .......................... 349/43; 257/72
(58) Field of Search .................. 349/43, 110, 111, 349/122, 138; 257/59, 72

(56) References Cited

U.S. PATENT DOCUMENTS 4,999,318 A * 3/1991 Takahumi et al. ..... 204/192.34
5,818,552 A * 10/1998 Sato .......................... 349/110
5,943,105 A * 8/1999 Fujikawa et al. .............. 257/57
6,256,077 B1 * 7/2001 Baek ............................ 257/59
6,271,543 B1 * 8/2001 Ohtani et al. .................. 257/40

FOREIGN PATENT DOCUMENTS

JP 06230419 A * 8/1994 ........... G02F/1/136

OTHER PUBLICATIONS

J. H. Kim et al., "Super–High–Aperture–Ratio TFT—LCD Structure", AM–LCD 1996, pp. 149–152.

* cited by examiner

Primary Examiner—Kenneth Parker
(74) Attorney, Agent, or Firm—RatnerPrestia

(57) ABSTRACT

A liquid crystal display device which includes an active element substrate in which a pixel electrode on an upper layer is connected to active element TFT beneath an interlayer insulation film through a contact hole provided on the interlayer insulation film beneath the upper layer. The contact hole has an approximately oval shape, and a major axis portion extending, roughly along a major axis of the contact hole, from the contact hole in the pixel electrode to nearby pixel electrode edges is located in a light-shielded area of the active element substrate. This prevents the occurrence of a defective pixel area, even a crack is generated in the pixel electrode, without reducing the aperture ratio.

39 Claims, 6 Drawing Sheets

LIQUID CRYSTAL DISPLAY DEVICE AND ITS MANUFACTURING METHOD

FIELD OF THE INVENTION

The present invention relates to the field of liquid crystal display devices employed in information processing terminals and video appliances, and their manufacturing methods. More particularly, the present invention relates to active matrix liquid crystal display devices with a high aperture ratio using an active element substrate.

BACKGROUND OF THE INVENTION

To increase the aperture ratio of an active matrix liquid crystal display devices, pixel electrodes are formed on the uppermost layer of each thin film layer forming active elements. This type of liquid crystal display device and its manufacturing method are disclosed for example in Super-High-Aperture-Ratio TFT-LCD Structure, Digest of Technical Papers 1996 International Workshop on Active Matrix Liquid Crystal Displays (AM-LCD '96), pp. 149–152 by J. H. Kim et. al.

FIG. 5A shows a perspective plan view of a single pixel of the disclosed liquid crystal display device. FIG. 5B is a sectional view taken along the dotted line 5B—5B in FIG. 5A. The liquid crystal display device shown in FIGS. 5A and 5B, includes a first substrate (a) which holds the active elements, a gate electrode (b), a gate insulation layer (c), a channel layer (d), source electrode wiring (e), and a drain electrode (f) forming a thin film transistor TFT. An insulation layer (g) is shown on the TFT. A contact hole (g1) for connecting the drain electrode (f) and pixel electrode (h) is formed in the insulation layer (g). A second substrate (i) for sandwiching a liquid crystal layer (k) between the the substrates has a light-shielding layer (j) (black matrix). The light-shielding layer (j) blocks the light from a portion of the liquid crystal layer (k) where electrical control of the pixel electrode (h) is incomplete.

For manufacturing such liquid crystal display device, first, the gate electrode (b) is formed on a glass first substrate (a). Then, the gate insulation layer (c), containing SiN and a-Si, and channel layer (d) are formed. After forming the source electrode wiring (e) and drain electrode (f), an insulation layer (g) having a contact hole (g1) is formed on the drain electrode (f) using low dielectric organic material (dielectric constant: 2.6–2.7) such as benzocyclobutane. A pixel electrode (h), connected to the drain electrode (f) through the contact hole (gl) is formed over the insulation layer (g) partially overlapping the source electrode wiring (e). The second substrate (i) with the light-shielding layer (j) is placed facing the first substrate (a), and the liquid crystal layer (k) is injected in-between to complete the liquid crystal display device.

The insulation layer (g) as provided above enables to extend the pixel electrode (h) up to the dotted line in FIGS. 5A and 5B, and up to the source electrode wiring (e) shown in FIG. 5A, while maintaining insulation. This allows to expand the liquid crystal driving area of the pixel electrode (h), resulting in an increased aperture ratio. Furthermore, by forming the insulation layer g with a low dielectric organic material, the parasitic capacitance between the pixel electrode (h) and source electrode wiring (e) may be reduced. This enables the achievement of a liquid crystal display device with high aperture ratio and low occurrence of cross talk.

However, the configuration of the conventional liquid crystal display device as described above may generate a crack in the pixel electrode (h), starting from the contact hole (g1), and cause a pixel defect in the liquid crystal display device. This phenomenon was investigated by means of a series of detailed experiments, and the following details were discovered.

As shown in FIG. 6, cracks (l) on the pixel electrode (h) tend to start from corners of the via hole along the contact hole (g1). They almost never start from a straight section. The crack is also likely to extend in the direction of the shortest distance between the contact hole (g1) and the edge of the pixel electrode (h). This behavior suggests that the crack occurs due to the formation of the pixel electrode (h) on the insulation layer (g) made of organic material. Since a heating process is used for the formation of the pixel electrode (h), the cracks (l) are thought to result from the difference in stress between the insulation layer (g) and pixel electrode (h).

The contact hole (g1) on the drain electrode (f) is normally nearly round, as shown in the conventional example in FIG. 5A. A regular square pattern is generally used as a photomask pattern for forming contact hole (g1). The pattern at the corners of the contact hole is not sharp and the corners of the contact hole become rounded as shown in FIG. 5A because the insulation layer g is relatively thick compared to the size of the contact hole. This is because it is necessary to minimize the area needed to create the contact hole (g1) on the drain electrode (f) for connecting the drain electrode (f) and the pixel electrode (h) and thus maintain the largest possible aperture ratio. The shape of the contact hole (g1) for electrically connecting the pixel electrode (h) and drain electrode (f) is usually minimum size, with the contact hole (g1) having a small radius of curvature for its open rim.

Accordingly, a crack from a via hole in the pixel electrode (h) along the contact hole (g1) may propagate in any direction. If several cracks (1a) reach the edge of the pixel electrode (h) from almost the same starting point, for example, as shown in FIG. 6, these cracks may separate a portion of the pixel electrode (h) from the connecting part with the drain electrode (f), generating a defective electrode area (h1) which has defective electrical connection with the drain electrode (f). In the defective electrode area (h1), a portion which is not covered by a light-shielded area including the light-shielding layer (j), drain electrode (f), and source electrode wiring (e) becomes a defective pixel area (h2), shown by the slanted lines in the defective electrode area (h1). The defective pixel area (h2) becomes visibly obvious when the liquid crystal display device is being driven.

SUMMARY OF THE INVENTION

The present invention aims to provide a liquid crystal display device with a high aperture ratio which eliminates defective pixel areas even if a crack occurs in a pixel electrode. The present invention further provides a method for manufacturing such liquid crystal display device.

A liquid crystal display device of the present invention includes an active element; a contact electrode connected to the active element; a pixel electrode; an insulation layer insulating the active element, and the contact electrode from the pixel electrode; and a contact hole provided in the insulation layer for connecting the contact electrode and pixel electrode. The contact hole has more than one radius of curvature. All portions of the pixel electrode close to small radiuses of curvature out of the aforementioned multiple radiuses of curvature of the contact hole are all located in a light-shielded area.

Moreover, the liquid crystal display device of the present invention includes the active element; a contact electrode connected to the active element; a pixel electrode; an inter-layer insulation layer for insulating the active element, and the contact electrode from the pixel electrode; a contact hole provided in the interlayer insulation layer for connecting the contact electrode to the pixel electrode. The contact hole has a major axis longer than another, minor axis perpendicular to the major axis. The portion of the pixel electrode close to the extended line of the major axis of the contact hole is located in the light-shielded area.

Still more, the liquid crystal display device of the present invention has an active element containing substrate that includes an upper layer over which the pixel electrode is located and the pixel electrode is connected to the active element under an interlayer insulation layer through a contact hole provided on the interlayer insulation layer beneath the upper layer. The contact hole has an oval, ellipse, peanut, or other asymmetric shapes having a major axis. A portion of the pixel electrode extending from the contact hole area along the major axis of the contact hole to adjacent edges of the pixel electrode is located in the light-shielded area.

The contact hole in the interlayer insulation layer has a shape wherein some portions have smaller radiuses of curvature than other portions. Or, the contact hole has a major axis which is longer than another, minor axis perpendicular to the major axis. Or, the contact hole has an oval, ellipse, peanut, or asymmetric shape having a major axis. In such contact holes, the location of small radiuses of curvature of its open rim will be limited. Accordingly, the occurrence of a crack may be limited to the location of small radiuses of curvature. addition. The the direction of the extension of the crack may be regulated because it has been found that it preferentially leads toward nearby edges of the pixel electrode. This observation permits to identify on the pixel electrode an area exhibiting a high probability for a crack to develop. Such crack will likely extend from the smallest radius in the hole rim, to the closest electrode edge.

A portion of the pixel electrode which extends from the contact hole to an adjacent edge of the pixel electrode roughly along the major axis direction of the contact hole matches (this limited) preferred direction of the crack. This enables to avoid a defective electrode area, even if it occurs, from being a visible pixel defective area which can be externally recognizable when driving the liquid crystal, because the defective electrode area is located inside the light-shielded area.

Most of the portion of the pixel electrode extending from the contact hole to the adjacent edges roughly along the major axis of the contact hole is already located in the light shielded area in the conventional designs. Therefore, the present invention does not reduce the aperture ratio of the active element substrate even if this area is specified as the light-shielded area.

Furthermore, the contact hole may be disposed at the corner close to the active element of the pixel electrode in a direction that the major axis of the contact hole crosses both edges making the corner. If the major axis of the contact hole is positioned perpendicular to a straight line bisecting an angle created by both edges of the pixel electrode at the corner of the pixel electrode, the major axis portion may be made smaller, enabling to further preferably prevent the reduction of the aperture ratio.

If the light-shielded area is an area shaded by the light-shielding layer and at least one of electrodes of the active elements, the reduction of the aperture ratio for securing alignment allowance of the light-shielding layer is preventable, realizing high aperture ratio.

If the active element is made of a thin film transistor, and a specified electrode for connecting the active element and pixel electrode is the drain electrode, cross talk may be further reduced.

If the interlayer insulation layer is made of an organic material, a thick interlayer insulation layer with low dielectivity may be formed, enabling to reduce a cross talk between electrodes.

If the pixel electrode is made of indium tin oxide, a low-resistance and high transmissivity electrode may be formed without damaging the active elements and interlayer insulation layer.

Still in accordance with this invention there is contemplated a method for manufacturing the liquid crystal display device of the present invention. The method includes the following steps forming an active element including an electrode connected to the active element on a substrate; forming an interlayer insulation layer having a contact hole which has more than one radius of curvature over the electrode of the active element; and forming a pixel electrode connected to the electrode through the contact hole in a way that portions of the pixel electrode close to smaller radiuses of curvature out of multiple radiuses of curvature of the contact hole are all located in a light-shielded area.

Still within the scope of the present invention, the method for manufacturing the liquid crystal display device of the present invention includes the following steps of: forming the active element and electrode connected to the active element on the substrate; forming the interlayer insulation layer having the contact hole which has a major axis longer than another axis perpendicular to the major axis and the major axis is located over a predetermined electrode of the active element; and forming the pixel electrode connected to the predetermined electrode through the contact hole in a way that the pixel electrode portion close to an extended line along the major axis of the contact hole is located in the light-shielded area.

Still more, the method for manufacturing the liquid crystal display device of the present invention includes the steps of: forming the electrodes such as those required for the active element and wiring on the substrate; forming the interlayer insulation layer having an approximately oval contact hole over a desired electrode of the active element; and forming the pixel electrode connected to the desired electrode through the contact hole on the interlayer insulation layer in a way that its major axis portion of the pixel electrode extending from the contact hole to an adjacent edge- roughly along the major axis is located in the light-shielded area.

Furthermore, the method for manufacturing the liquid crystal display device of the present invention features another step of forming a light-shielding layer in a way to form a light-shielded area to cover the portion of the pixel electrode which extends from the contact hole to the adjacent edges roughly along the major axis direction.

These manufacturing methods enable to fabricate the liquid crystal display device with the above conventional characteristics by just changing the shape of the contact hole and the positional relationship of the pixel electrode and contact hole.

Furthermore, the method for manufacturing the liquid crystal display device of the present invention includes the steps of forming the pixel electrode connected to the predetermined electrode of the active element through the contact hole on the interlayer insulation layer in a way to block the light from at least a part of the major axis portion extending from the contact hole by overlaying the predetermined electrode; and forming the light-shielding layer to create the light-shielded area to cover another part of the major axis portion which is not covered by the predetermined electrode. With this method, the liquid crystal display device in which the light-shielded area is blocked the light by the light-shielding layer and at least one of electrodes of the active element. Also in these manufacturing methods, it is preferable to employ a thin film transistor for the active element, the drain electrode for the desired predetermined electrode, an organic material for the interlayer insulation layer, and indium tin oxide for the pixel electrode.

The above characteristics of the present invention are detailed in the following description and drawings. Each characteristics of the present invention may be applied independently or in combinations.

DESCRIPTION OF THE PREFERRED EMBODIMENT

Figure 1A:
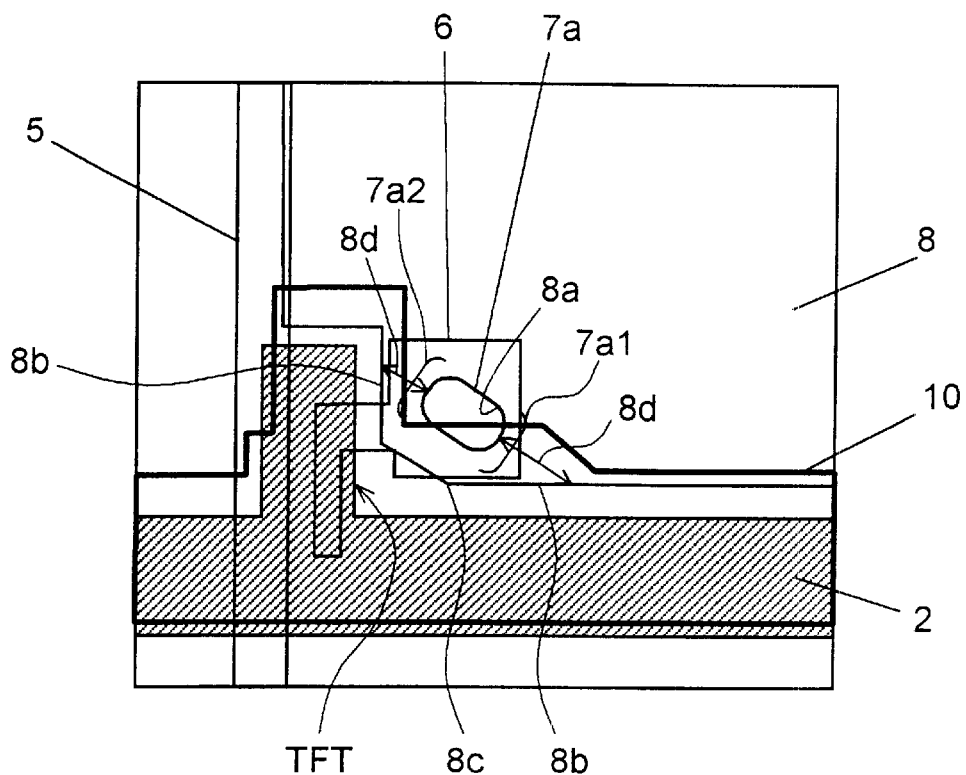
FIG. 1A is a schematic plan view of a single pixel of a liquid crystal display device in accordance with first and second exemplary embodiments of the present invention.

Liquid crystal display devices in exemplary embodiments of the present invention are described with reference to FIGS. 1A to 4C.

First exemplary embodiment

The present invention includes four exemplary embodiments as shown in FIGS. 1A to 4C, with common parts described first. A liquid crystal display device of the present invention includes an active element substrate A in which a pixel electrode 8 on an uppermost layer is connected to the drain electrode 6 of a thin film transistor (TFT) through a contact hole 7a created on an interlayer insulation layer 7 beneath the pixel electrode 8, and a facing (front) substrate 9. The substrate A containing the active element and the facing substrate 9 are opposite each other, separated by ball spacers (not illustrated) in-between. Liquid crystal 11 is sandwiched and sealed between the active element substrate A and facing substrate 9. A light-shielding layer 10 is provided on the inner surface of the facing substrate 9 to shield light at a liquid crystal area which may not be controllable by pixel electrodes. In the actual liquid crystal display device, an orientation layer is formed over the surface of the pixel electrode 8 and on the facing substrate 9, but this is not illustrated in the figures because it is not necessary for describing the exemplary embodiments of the present invention.

As shown in FIGS. 1A to 4C, an elongated contact hole 7a having a major axis and a minor axis perpendicular thereto is formed in the liquid crystal display device in the exemplary embodiments of the present invention. Such elongated hole may be approximately elliptical or oval, or any other elongated shape and may have a plurality of radiuses of different curvature including small radiuses and larger radiuses. Major axis portions 8d and 8d extending up to pixel electrode edges 8b and 8b approximately close to the major axis of the elongated contact hole 7a, and the area surrounding the major axis portions 8d and 8d are located in the light-shielded area formed typically of the light-shielding layer 10.

Figure 2A:
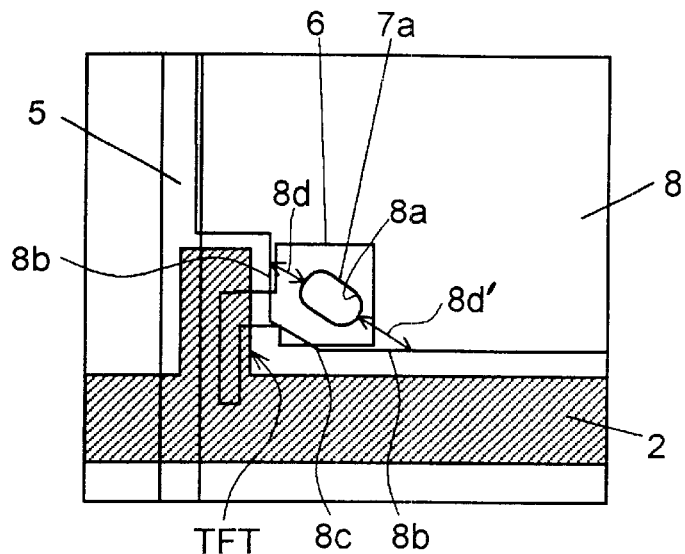
FIG. 2A is a schematic plan view illustrating a first manufacturing step of an active element substrate for a device of the type shown in FIGS. 1A and 1B.
Figure 2B:
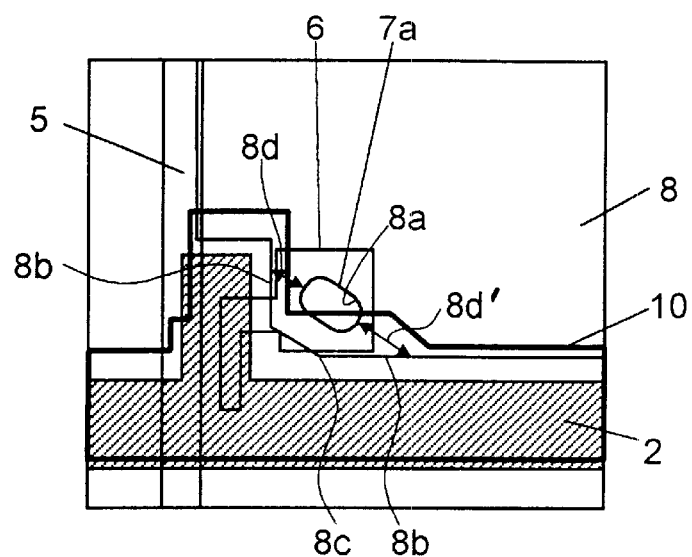
FIG. 2B is a schematic plan view illustrating the active element substrate and facing substrate of the liquid crystal display device following another manufacturing step in accordance with this invention.
Figure 2C:
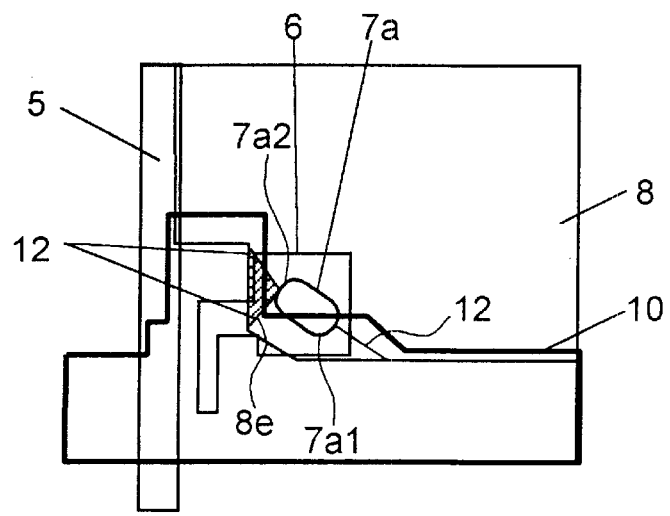
FIG. 2C illustrates the state of the occurrence of a crack in a pixel electrode and the light-shielding state in the liquid crystal display device shown in FIG. 2B.
Figure 3A:
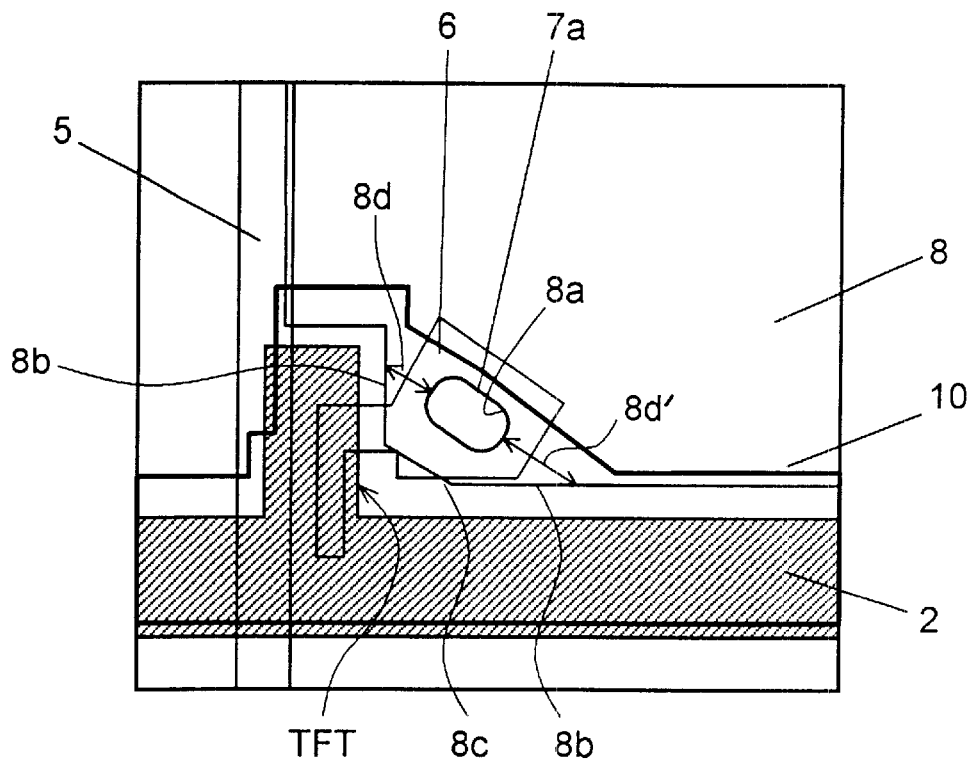
FIG. 3A is a schematic plan view of another liquid crystal display device manufactured according to this invention.
Figure 3B:
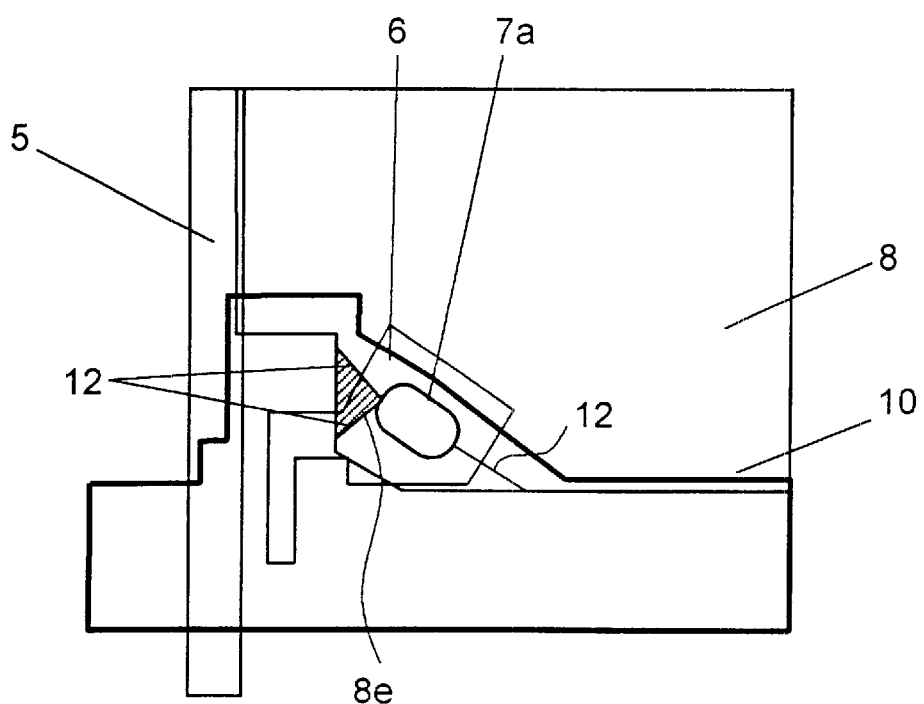
FIG. 3B illustrates the state of the occurrence of a crack in a pixel electrode and the light-shielding state in the liquid crystal display device shown in FIG. 3A.
Figure 4A:
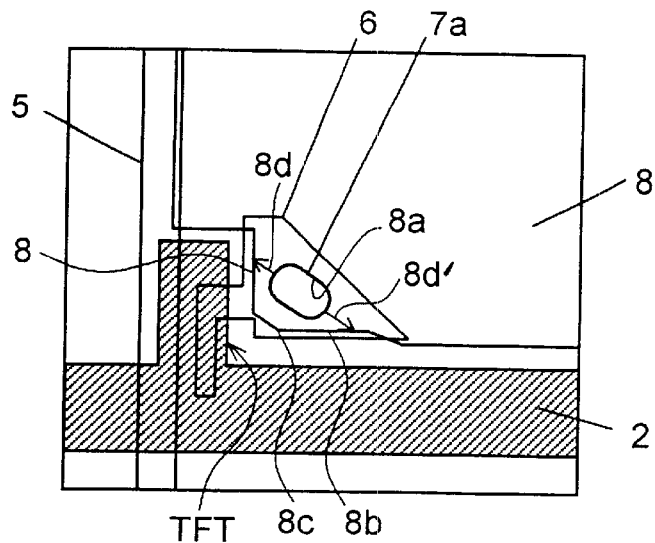
FIG. 4A is a schematic plan view illustrating the manufacturing state of an active element substrate in accordance with embodiment four of the present invention.
Figure 4B:
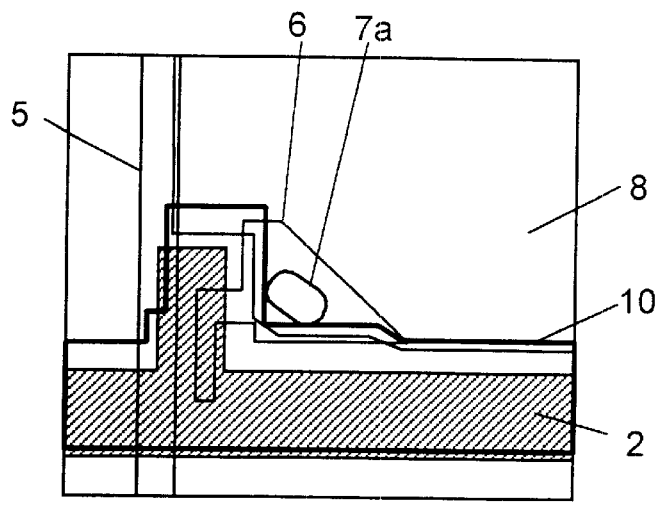
FIG. 4B is a schematic plan view of the active element substrate and facing substrate of the liquid crystal display device of FIG. 4A including the light-shielding layer.
Figure 4C:
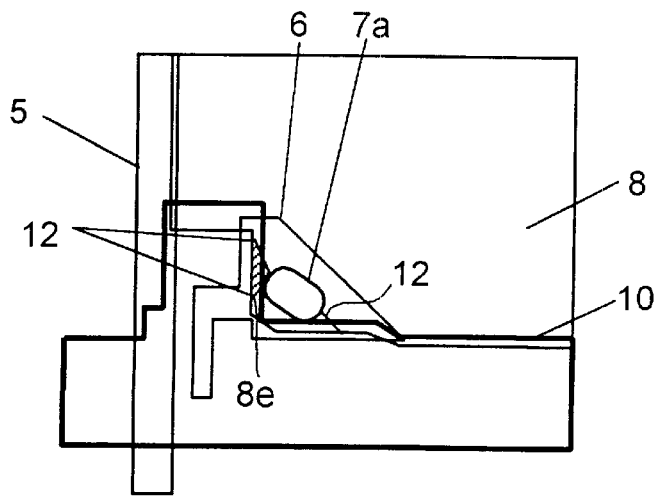
FIG. 4C illustrates the state of the occurrence of a crack in a pixel electrode and the light-shielding state in the liquid crystal display device shown in FIG. 4B.
Figure 5A:
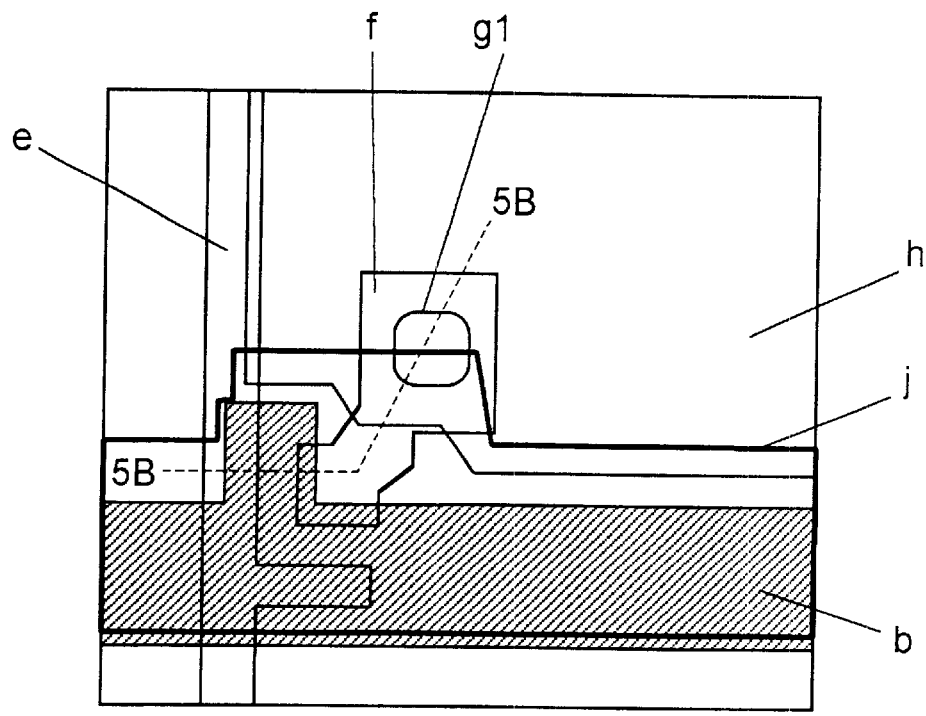
FIG. 5A is a schematic plan view of a conventional liquid crystal display device manufactured according to the prior art.
Figure 5B:
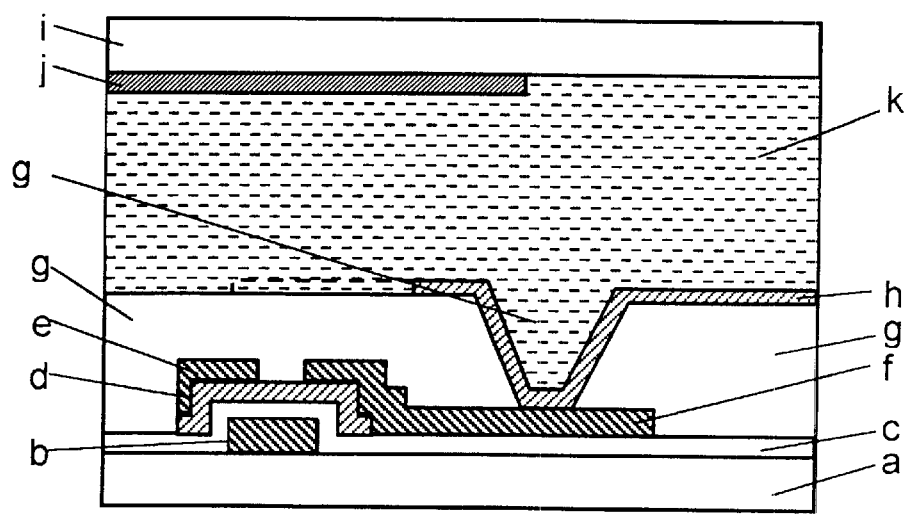
FIG. 5B is a schematic sectional elevation view of the device of FIG. 5A.
Figure 6:
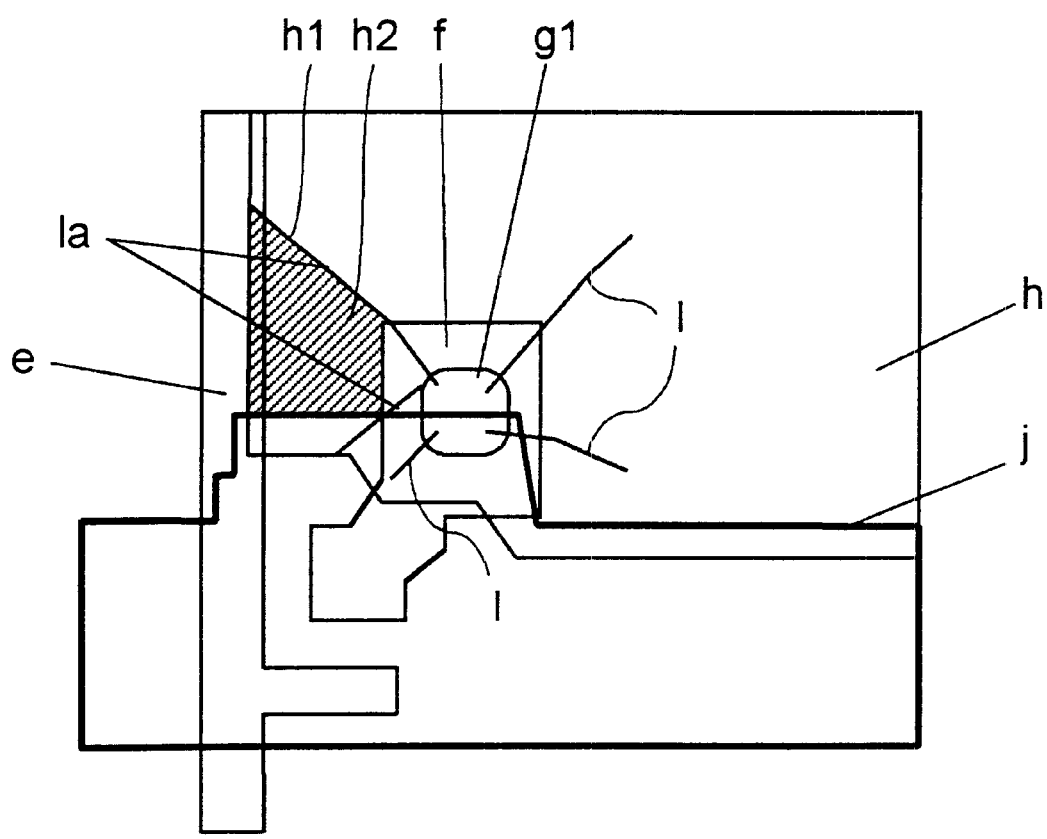
FIG. 6 illustrates the state of the occurrence of a crack and the light-shielding state in the liquid crystal display device shown in FIGS. 5A and 5B.

By creating a contact hole 7a with an approximately ellipse or oval shape on the interlayer insulation layer 7, the portion of an open rim of the contact hole 7a which has a small radius of curvature and thus is more likely to generate a crack is limited to two identifiable parts, which are ends 7a1 and 7a2, in the major axis direction of the ellipse contact hole 7a. Even if cracks 12 occur on the pixel electrode 8 starting from the via hole 8a along the shape of the contact hole 7a, as shown in FIGS. 2C, 3B, and 4C, the extensions of cracks 12 can be restricted to be limited from both ends 7a1 and 7a2 of the contact hole 7a to the nearby pixel electrode edges 8b and 8b. The shapes of the contact holes which restrict the direction of the cracks 12, which may occur are detailed in each exemplary embodiment of the present invention with reference to the oval or ellipse shape shown in FIGS. 1A to 4C. However, as long as the contact hole has one major axis longer than the other, any shape is acceptable, including a peanut shape. The contact hole may further have a flattened ellipse or oval shape, which has an even smaller radius of curvature at the ends 7a1 and 7a2 of the ellipse shape, with both ends linked by a curved line having a relatively larger radius of curvature. Furthermore, asymmetric shapes such as a crescent shape which have a smaller radius of curvature at their ends are acceptable.

Portions 8d and 8d of the pixel electrode 8 roughly along the major axis direction between the contact hole 7a and pixel electrode edges 8b and 8b match the direction in which the cracks 12 are encouraged, and therefore the cracks 12 occur only along portions of the pixel electrode 8d and 8d along this major axis. Accordingly, even if the cracks 12 are generated and create a defective electrode area 8e (refer to FIGS. 2C, 3B, and 4C), this defective electrode area 8e is located within the light-shielded area of the light-shielding layer 10, and thus is not externally recognizable even when the liquid crystal display device is driven. The defective electrode area 8e does not thus result in a defective pixel area.

In addition, as shown in FIG. 1A, even if an area around the portions of the pixel electrode 8d and 8d along the major axis is determined as a light-shielded area covered typically by the light-shielding layer 10, any detrimental effect on the aperture ratio of the active element substrate A remains extremely small.

As described above, in the liquid crystal display device in the exemplary embodiments of the present invention, the contact hole 7a is disposed close to a corner 8C of the pixel electrode 8 located near the thin film transistor TFT in a way that its major axis crosses the pixel electrode edges 8b and 8b of the corner 8c. More preferably, the major axis of the contact hole 7a may be disposed in a direction that subtends an angle of 45° to the pixel electrode edges 8b and 8b. In other words, in general, the major axis of the contact hole 7a is preferably disposed perpendicularly to a straight line bisecting the angle formed by the pixel electrode edges 8b and 8b. This prevents any decrease in the aperture ratio of the active element substrate A. The corner 8c of the pixel electrodes 8b and 8b are cut off approximately parallel to the major axis of the contact hole 7a. This enables the pixel electrode edges 8b and 8b to be brought as close as possible to the contact hole 7a to restrict the extension of the crack to this portion.

The exemplary embodiments shown in FIGS. 1A to 4C employ a thin film transistor (TFT) as the active element for reducing cross talk. By the use of an interlayer insulation layer 7 made of an organic material, cross talk caused by parasitic capacitance may be reduced because the parasitic capacitance between the pixel electrode 8 and source electrode 5 is reduced by the formation of the thick interlayer insulation layer 7 with a low dielectric constant.

Second exemplary embodiment

Figure 1B:
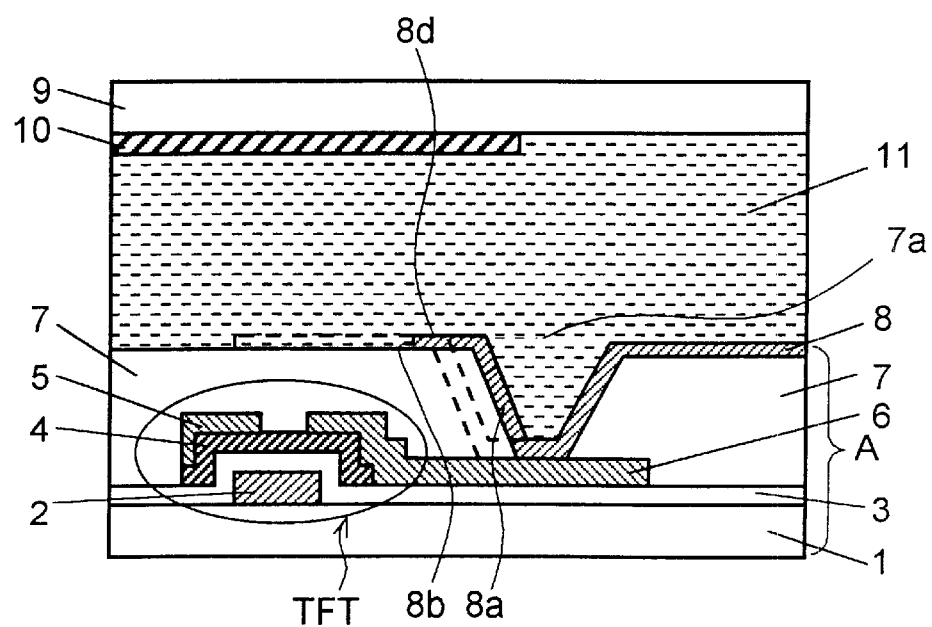
FIG. 1B is a sectional schematic elevation view of FIG. 1A.

A liquid crystal display device in accordance with the second exemplary embodiment of the present invention is described with reference to FIGS. 1A to 2C. First, a method for manufacturing the liquid crystal display device of the second exemplary embodiment is described. As shown in FIGS. 1B and 2A, the gate electrode 2 of a thin film transistor (TFT) is deposited on a glass substrate 1, and a SiN layer, which acts as the gate insulation layer 3, and an a-Si layer as a channel layer are deposited on the entire face of the substrate 1 holding the gate electrode 2. The deposited a-Si layer is photolithographically processed into the shape of the channel layer 4, and then Ti and Al, which become the source and drain electrodes 5 and 6, are deposited over the entire face. The deposited Ti and Al are processed to form the source electrode wiring 5 and drain electrode 6.

Next, a photosensitive organic material (PC-302 by JSR) is applied on the entire face of the processed substrate 1 by spinning, and an interlayer insulation layer 7 with an elongated hole, which may be approximately an elliptical or oval contact hole 7a, is formed by exposure and development using a photomask. A pixel electrode 8 made of indium tin oxide which is connected to the drain electrode 6 through the contact hole 7a is formed over the interlayer insulation layer 7, and partially overlaps the source electrode wiring 5. The shape and positional relationship among the drain electrode 6, contact hole 7a, and pixel electrode 8 are as follows. The entire major axis portions 8d and 8d between the contact hole 7a and adjacent pixel electrode edges 8b and 8b of the major axis of the contact hole 7a are overlaid in the light-shielded area formed by the combination of the light-shielding layer 10 and drain electrode 6, which is one of the electrodes. This completes the active element substrate A.

Lastly, liquid crystal 11 is sandwiched between the active element substrate A and facing substrate 9, and sealed (FIG. 1B). Here, the light-shielding layer 10 of the facing substrate 9 and active element substrate A are positioned as shown in FIG. 2B.

In this exemplary embodiment, all cracks 12 which may occur will typically start either or from both ends 7a1 and 7a2 of the contact hole 7a, and will reach the closest edges 8b and 8b of the pixel electrode 8. Accordingly, a defective pixel electrode area 8e, to which it is considered difficult to supply the appropriate potential, created due to being surrounded by several cracks 12 starting from almost the same point and, therefore, isolated from any area in electrical contact with the drain electrode 6, will also be overlaid with the light-shielding layer 10 and drain electrode 6 which make the light-shielded area. The defective pixel electrode area 8e is thus not visible while driving the liquid crystal display device, and therefore the second exemplary embodiment prevents the occurrence of practical defective display area.

The light-shielded area for preventing the defective pixel electrode area 8e from appearing as a defective display area may be provided by independently using at least one of the light-shielding layer 10 and one of the electrodes of the active element such as the thin film transistor TFT. If the light-shielded area is formed using the light-shielding layer 10 and at least one of the active element electrodes, as in this exemplary embodiment, allowance in alignment of the light-shielding layer 10 and active element substrate A may be secured. This minimizes the size of both drain electrode 6 and light-shielding layer 10, resulting in the prevention of a decrease in the aperture ratio. Accordingly, it is preferable to shield the light from the major axis portions 8d and 8d by overlaying with as many electrodes of active elements as possible.

Third exemplary embodiment

A liquid crystal display device in a third exemplary embodiment is described with reference to FIGS. 3A and 3B. After the active element substrate A is fabricated in the same way as the second exemplary embodiment, the light-shielding layer 10 is formed and the liquid crystal 11 is sandwiched and sealed between the facing substrate 9 and the active element substrate A. A point which differs from the first exemplary embodiment is that the light-shielding layer 10 is disposed to shade the entire major axis portions 8d and 8d between the contact hole 7a and the pixel electrode edges 8b and 8b roughly following the major axis of the contact hole 7a. Other configurations and manufacturing method are the same as those in the first exemplary embodiment, and thus explanation of the same parts and materials are omitted here by giving the same reference numerals.

The third exemplary embodiment thus securely prevents the defective electrode area 8e caused by the cracks 12 in the pixel electrode portions 8d and 8d along the major axis from becoming the defective pixel area because the entire major axis portions 8d and 8d are covered by the light-shielding layer 10, as shown in FIG. 3B. The defective electrode area 8e is totally unrecognizable from the outside. In the third exemplary embodiment, the drain electrode 6 only requires a size large enough to allow connection to the pixel electrode 8. This enables to secure larger distance between the TFT drain electrode and adjacent source electrode, which results in the additional effect of reducing the occurrence of a dot defect caused by remaining wiring metal layer in the manufacturing process.

Fourth exemplary embodiment

A liquid crystal display device in a fourth exemplary embodiment is described with reference to FIGS. 4A to 4C. After the active element substrate A is fabricated in the same way as the second exemplary embodiment, the liquid crystal 11 is sandwiched and sealed between the active element substrate A and the facing substrate 9 having the light-shielding layer 10. A point which differs from the first and second exemplary embodiments is that the entire portion of the pixel extending along major axis sections 8d and 8d extending from the contact hole 7a, are shaded by overlaying with the drain electrode 6. Other configurations are the same, and thus explanation of the same parts and materials are omitted here by giving the same reference numerals.

With the configuration as described above, the light-shielding layer 10 may not necessary be formed to cover the major axis portions 8d and 8d. This allows the use of an existing mask pattern for the light-shielding layer.

In the exemplary embodiments of the present invention, the interlayer insulation layer 7 is a photosensitive organic material. The insulation layer 7 may also be made by depositing a non-photosensitive low dielectric layer, and etching the dielectric layer using the photo resist into the interlayer insulation layer 7. The active element is made of a thin film transistor (TFT), but other elements applicable to driving liquid crystals such as non-linear two-terminal elements, including MIMs, may be used.

In the exemplary embodiments of the present invention, the light-shielding layer 10 is formed on a surface of the facing substrate 9. The present invention is also applicable to a so-called black matrix light-shielding on array in which the light-shielding layer is formed on the active element substrate A.

In the exemplary embodiments, of the present invention has been described using an approximately elliptical or oval contact hole. A contact hole with a peanut shape or a crescent shape is also referred to in the exemplary embodiments. However, the liquid crystal display device of the present invention is not limited to these shapes. The point is that the contact hole has one major axis longer than other axes for example perpendicular to the major axis. In such case, a crack is more likely to occur in the direction of the major axis, and thus a similar effect to that created by an ellipse or an approximately oval contact hole is achievable.

Any crack is likely to occur in the area of the contact hole with the smallest radius of curvature, and is unlikely to occur in areas with a larger radius of curvature. Accordingly, the likely position of crack occurrence is controllable at the design stage by creating a contact hole with more than one radius of curvature, and providing an area of the contact hole with a small radius of curvature at a predetermined position. This enables the prevention of a defective pixel area that would otherwise be noticeable. Such design allows to employ a contact hole with different shapes.

As described above, the present invention has the advantageous effect of preventing the occurrence of practical defective pixel area without significantly decreasing the aperture ratio even if a defective electrode area occurs as the result of a crack in the pixel electrode.

REFERENCE NUMERALS 1 substrate
2 gate electrode
3 gate insulation film
4 channel layer
5 source electrode
6 drain electrode
7 interlayer insulation film
7a contact hole
8 pixel electrode
8a via hole
8b pixel electrode edge
8c corner of pixel electrode
8d major axis portion
8e defective electrode area
9 facing substrate
10 light-shielding film
11 liquid crystal
12 crack
A active element substrate

What is claimed is:

1. A liquid crystal display device having a substrate that includes an active element, the substrate having a pixel electrode having edges on an upper layer connected to a predetermined electrode of the active element beneath an interlayer insulation layer through a contact hole provided in said interlayer insulation layer; the device also including a light shielded area;

wherein said contact hole has a major axis, said hole extending roughly along said major axis said axis extending to a nearby pixel electrode edge said axis located in a light-shielded area, and said contact hole is disposed in a corner of the pixel electrode near to the active element formed by two pixel electrode edges in a way that said major axis crosses both edges forming said corner of said pixel electrode.

2. The liquid crystal display device as defined in claim 1, wherein the pixel electrode has two edges forming an angle and wherein said major axis of said contact hole is perpendicular to a straight line bisecting said angle.

3. The liquid crystal display device as defined in claim 2 wherein said active element is a thin film transistor, and said predetermined electrode connected to said pixel electrode is a drain electrode.

4. The liquid crystal display device as defined in claim 2 wherein said interlayer insulation film is an organic film.

5. The liquid crystal display device as defined in claim 2 wherein said pixel electrode is indium tin oxide.

6. The liquid crystal display device as defined in claim 1, wherein said corner of the pixel electrode closest to said contact hole has an apex and wherein said apex is cut off approximately parallel to said major axis.

7. The liquid crystal display device as defined in 6, wherein said light-shielded area is an area shaded by a light-shielding layer and at least one of electrodes of said active element.

8. The liquid crystal display device as defined in claim 6 wherein said active element is a thin film transistor, and said predetermined electrode connected to said pixel electrode is a drain electrode.

9. The liquid crystal display device as defined in claim 6 wherein said interlayer insulation film is an organic film.

10. The liquid crystal display device as defined in claim 6, wherein said pixel electrode is indium tin oxide.

11. The liquid crystal display device as defined in 1, wherein said light-shielded area is an area shaded by a light-shielding film and at least one of electrodes of said active element.

12. The liquid crystal display device as defined in 2, wherein said light-shielded area is an area shaded by a light-shielding layer and at least one of electrodes of said active element.

13. The liquid crystal display device as defined in claim 1 wherein said active element is a thin film transistor, and said predetermined electrode connected to said pixel electrode is a drain electrode.

14. The liquid crystal display device as defined in claim 1 wherein said active element is a thin film transistor, and said predetermined electrode connected to said pixel electrode is a drain electrode.

15. The method for manufacturing a liquid crystal display device in according to claim 14, wherein said active element is a thin film transistor, and said active element electrode connected to said pixel electrode is a drain electrode.

16. The liquid crystal display device as defined in claim 1 wherein said interlayer insulation film is an organic film.

17. The liquid crystal display device as defined in claim 1 wherein said interlayer insulation film is an organic film.

18. The liquid crystal display device as defined in claim 1, wherein said pixel electrode is indium tin oxide.

19. The liquid crystal display device as defined in claim 1, wherein said pixel electrode is indium tin oxide.

20. A method for manufacturing a liquid crystal display device, comprising:
   forming electrodes, including electrodes of an active element and wiring, over a substrate;
   forming an insulation layer over an electrode of said active element, and a contact hole in said layer having an approximately oval shape with a major axis; and
   forming a pixel electrode over said insulation layer; said pixel electrode being connected to said electrode of said active element through said contact hole wherein said contact hole is disposed in a corner of the pixel electrode near to the active element formed by two pixel electrode edges in a way that said major axis crosses both edges forming said corner of said pixel electrode;
   shielding from light a portion of said pixel electrode extending, roughly along said major axis of said oval contact hole and from said contact hole to adjacent edges of said pixel electrode light-shielded area.

21. The method for manufacturing a liquid crystal display device according to claim 20, wherein said insulation layer is made of an organic material.

22. The method for manufacturing a liquid crystal display device as according to claim 15, wherein said insulation layer is made of an organic material.

23. The method for manufacturing a liquid crystal display device according to claim 20, wherein said pixel electrode is formed of indium tin oxide.

24. The method for manufacturing a liquid crystal display device according to claim 15, wherein said pixel electrode is formed of indium tin oxide.

25. A method for manufacturing a liquid crystal display device, comprising:
   forming electrodes, including an electrode of an active element and wiring, on a substrate;
   forming an insulation layer over an electrode of said active element, and a contact hole having a major axis in said insulating layer;
   forming a pixel electrode having edges over said insulation layer, connected to said electrode of said active element through said contact hole wherein said contact hole is disposed in a corner of the pixel electrode near to the active element formed by two pixel electrode edges in a way that said major axis crosses both edges forming said corner of said pixel electrode; and
   forming a light-shielding layer shielding a portion of said pixel electrode extending roughly along said major axis of said contact hole, from said contact hole to the edges of said pixel electrode.

26. The method for manufacturing a liquid crystal display device according to claim 25, wherein said active element is a thin film transistor, and said predetermined electrode connected to said pixel electrode is a drain electrode.

27. The method for manufacturing a liquid crystal display device according to claim 25, wherein said interlayer insulation film is an organic film.

28. The method for manufacturing a liquid crystal display device according to claim 26, wherein said interlayer insulation film is an organic film.

29. The method for manufacturing a liquid crystal display device according to claim 25, wherein said pixel electrode is made of indium tin oxide.

30. The method for manufacturing a liquid crystal display device according to claim 25, wherein said pixel electrode is made of indium tin oxide.

31. The method for manufacturing a liquid crystal display device according to claim 26, wherein said pixel electrode is made of indium tin oxide.

32. The method for manufacturing a liquid crystal display device according to claim 27, wherein said pixel electrode is made of indium tin oxide.

33. A method for manufacturing a liquid crystal display device, comprising:
   forming electrodes, of an active element and wiring, over a substrate;
   forming an insulation layer over said active element, said insulation layer having a hole having a major axis, said hole located over a desired electrode of said active element;
   forming a pixel electrode over said insulation layer, connected to said desired electrode through said contact hole, wherein a portion of said pixel electrode extending roughly along said axis of said contact hole, and from said contact hole to an edge of said pixel electrode is partially over said desired electrode, said desired electrode blocking light transmission and wherein said contact hole is disposed in a corner of the pixel electrode near to the active element formed by two pixel electrode edges in a way that said major axis crosses both edges forming said corner of said pixel electrode; and
   forming a light-shielding layer providing a light-shielded area which blocks light transmission to a remaining area of said portion of said pixel electrode which is not over said desired electrode.

34. The method for manufacturing a liquid crystal display device as defined in claim 33, wherein said active element is a thin film transistor, and said desired electrode connected to said pixel electrode is a drain electrode.

35. The method for manufacturing a liquid crystal display device according to claim 33, wherein said insulation layer is made of an organic material.

36. The method for manufacturing a liquid crystal display device according to claim 34, wherein said insulation layer is made of an organic material.

37. The method for manufacturing a liquid crystal display device according to claim 33, wherein said pixel electrode is made of indium tin oxide.

38. The method for manufacturing a liquid crystal display device according to claim 34, wherein said pixel electrode is made of indium tin oxide.

39. The method for manufacturing a liquid crystal display device according to claim 35, wherein said pixel electrode is made of indium tin oxide.

* * * * *